(12) United States Patent
Haynes et al.

(10) Patent No.: US 10,527,200 B2
(45) Date of Patent: Jan. 7, 2020

(54) MULTI-FIT CLIP

(71) Applicant: LAKE PRODUCTS LIMITED, Auckland (NZ)

(72) Inventors: Andrew Leo Haynes, Auckland (NZ); Christopher Charles Morrow, Auckland (NZ); Michael John Sumner, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 15/980,444

(22) Filed: May 15, 2018

(65) Prior Publication Data

US 2019/0113155 A1    Apr. 18, 2019

Related U.S. Application Data

(63) Continuation of application No. 15/317,540, filed as application No. PCT/IB2015/054610 on Jun. 19, 2015, now Pat. No. 10,001,226.

(30) Foreign Application Priority Data

Jun. 20, 2014    (NZ) ...................................... 626526

(51) Int. Cl.
| F16L 3/10 | (2006.01) |
| F16L 3/137 | (2006.01) |
| F16L 3/24 | (2006.01) |
| H02G 3/32 | (2006.01) |
| F16B 2/08 | (2006.01) |
| F16L 3/18 | (2006.01) |
| F16L 3/20 | (2006.01) |

(52) U.S. Cl.
CPC .............. *F16L 3/1058* (2013.01); *F16B 2/08* (2013.01); *F16L 3/137* (2013.01); *F16L 3/18* (2013.01); *F16L 3/20* (2013.01); *F16L 3/24* (2013.01); *H02G 3/32* (2013.01)

(58) Field of Classification Search
CPC ... F16L 3/1058; F16L 3/18; F16L 3/20; F16B 2/08
USPC ............... 248/60, 68.1, 70, 74.1, 74.2, 74.3; 24/16 PB
See application file for complete search history.

(56) References Cited

U.S. PATENT DOCUMENTS

| 2,632,217 A | 3/1953 | Flora |
| 3,913,876 A | 10/1975 | McSherry |
| 4,447,934 A | 5/1984 | Anscher |

(Continued)

OTHER PUBLICATIONS

International Search Report and Written Opinion regarding Int'l. Appl. No. PCT/IB2015/054610 dated Nov. 9, 2015, 16 pps.

*Primary Examiner* — Gwendolyn W Baxter
(74) *Attorney, Agent, or Firm* — Foley & Lardner LLP

(57) ABSTRACT

A clip, for securing a portion of a long thin item such as a cable or pipe, includes a cradle portion for receiving a surface of an item to be secured, a fixing portion with at least one formation extending to be securable to a support, and a flexible member extending from a location at or adjacent an end of the cradle portion. The flexible portion has a free end and formations at or near the free end to engage with other formations fixed in relation to the cradle portion. In use, the cradle portion and the flexible member define an enclosing loop, such that the flexible member may hold an item against the cradle.

55 Claims, 11 Drawing Sheets

(56) References Cited

U.S. PATENT DOCUMENTS

| | | | |
|---|---|---|---|
| 4,462,141 A | | 7/1984 | Bogese |
| 4,510,650 A | | 4/1985 | Espinoza |
| 4,862,561 A | | 9/1989 | Lichtenberg |
| 5,332,179 A | * | 7/1994 | Kuffel .................... F16L 3/233 24/16 R |
| 5,385,321 A | | 1/1995 | Kume et al. |
| 5,669,731 A | | 9/1997 | Hironaka et al. |
| 5,794,461 A | | 8/1998 | Smith |
| 5,947,631 A | | 9/1999 | Hironaka et al. |
| 6,149,109 A | * | 11/2000 | Stankowski .......... F16L 3/2334 24/16 PB |
| 6,203,240 B1 | | 3/2001 | Hironaka et al. |
| 6,402,096 B1 | | 6/2002 | Ismert et al. |
| 7,316,375 B2 | | 1/2008 | Wakabayashi et al. |
| 7,861,981 B2 | * | 1/2011 | Olver .................... F16L 3/137 24/16 PB |
| 8,955,198 B2 | * | 2/2015 | Carnevali .......... B65D 63/1063 24/16 PB |
| 2006/0191111 A1 | * | 8/2006 | Pearson ................ F16L 3/137 24/16 R |

\* cited by examiner

MULTI-FIT CLIP

CROSS REFERENCE TO RELATED APPLICATIONS

The present application is a continuation of, and claims the benefit of priority to, U.S. patent application Ser. No. 15/317,540, filed on Dec. 9, 2016, which is a national stage entry of PCT/IB2015/054610, which claims priority to New Zealand Patent Application No. NZ626,526, the complete disclosures of which are all hereby incorporated by reference.

FIELD OF THE INVENTION

The present invention relates to supports for securing an item relative to a support. Typically the item will be a pipe, conduit or cable. The support will typically be a wall, ceiling, soffit, floor, gantry or any other structure.

BACKGROUND TO THE INVENTION

Typical construction includes many examples of pipe, conduit and cables to be supported relative to an underlying structure. For example water may be supplied through supply pipes of relatively small diameter, waste may be carried in pipes of larger diameter, rain water carried from roof in pipes of still larger diameter. Other services may also be carried in pipes of many possible diameters. For example electrical or communication cables may also be carried in conduit, with sizes selected according to the cables being carried.

Tidy installation requires that these pipes and conduits are supported relative to the underlying structure so that they are not easily dislodged by being knocked, by vibration, by the action of any internal contents flowing through them, or through seismic activity. Proper support can prevent the conduit being unduly stressed, and therefore increase the life of the system. In addition, some pipes require reasonably precise location, for example to maintain a specific fall along the length of the pipe.

Typical pipe or conduit systems include proprietary clips for securing the pipe or conduit in place. The clips are typically specific to the diameter of conduit being installed. An installer must carry sufficient clips to properly secure all of the different conduit or pipe sizes that he may be required to install.

It is an object of the present invention to provide a clip for securing an item relative to a support which goes some way toward overcoming these disadvantages or which will at least provide the industry with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In a first aspect of the invention, there is a clip (for securing a portion of a long thin item such as a cable or pipe) comprising:

a cradle portion for receiving a surface of a an item to be secured, a fixing portion with at least one formation extending to be securable to a support, and a flexible member extending from a location at or adjacent an end of the cradle portion, the flexible portion having a free end and formations at or near the free end to engage with other formations fixed in relation to the cradle portion such that the cradle portion and the flexible member define an enclosing loop, such that the flexible member may hold an item against the cradle.

Preferably the formations progressively engage with tightening of the loop and prevent loosening of the loop through direct tension on the flexible member.

Preferably the cradle is formed as surfaces of an inwardly facing aspect of a cradle member, and the other formations are on an outwardly facing aspect of the cradle member (such that an item pressing on the cradle urges the cradle member formations toward the flexible portion).

Preferably a retaining member is spaced apart from the outwardly facing side of the cradle member sufficient that the free end of the flexible portion may pass between the retaining member and the cradle member.

Preferably the form and arrangement of the flexible member, the cradle member and the retaining member are such that the engagement between formations is enhanced by tension applied to the flexible member.

Preferably the free end of the flexible portion has a stiffness sufficient that the outwardly facing surface or edge of the free end bears against the retaining member by pivoting of the free end around an end of the cradle member when tension is applied to the flexible member, with engagement between formations of the flexible member and the cradle member at or adjacent the fulcrum of this pivot.

Preferably the cradle member, the flexible member and the formations are formed from a plastic material as a single body.

Preferably the fixing portion includes at least one tab portion extending away from the cradle, the tab portion including a fixing formation (for example a lug, pin, recess or hole).

Preferably the flexible member is sufficiently stiff to be self supporting, and extending in an arc generally away from the cradle and fixing portion, across above the cradle and back toward the cradle and fixing portion, such that the flexible member defines more than half of the perimeter of the loop.

Preferably the flexible member defines more than two thirds of the perimeter of the loop.

Preferably the flexible member includes formations distributed along the inner surface for a length greater than the length of the cradle member.

Preferably the flexible member includes ribs on its outward surface.

Preferably the flexible member includes a zone intended for cutting such that the member may be shortened to the zone.

Preferably the zone for cutting is adjacent a rib on the outer surface, being located along the flexible member between the rib and the free end.

Preferably the zone for cutting along an inner surface of the flexible member is devoid of said formations.

Preferably one or more of the ribs, when in association with said cradle, urges the flexible member into greater engagement in the socket.

Preferably one or more of the ribs that enter the socket, runs on the surface of the retaining member, to pivot an inserted portion of the flexible member toward the cradle member, and in-use, encourage or bring formations of the socket and the flexible member into an engaged condition.

Preferably the loop can be at least 50 mm diameter

Preferably the formations on the flexible member extend at least 60 mm along the flexible member (such that the loop will accommodate items with diameter variations up to approximately 18 mm.

Preferably the cradle member is supported from one or more of the retaining member and the fixing portion by walls at both sides adjacent an end of the cradle member, to leave a socket into which the free end of the flexible member may be inserted, the socket defined by the retaining member, the cradle member and the walls.

Preferably the wall at one side is frangible, formed so as to be readily removed or rendered passable.

Preferably the socket includes an opening on the opposite side from the frangible wall, the opening being spaced from the entrance to the socket, in use a tool may be inserted into the opening to act against a portion of the flexible member which is engaged within the socket Preferably the formations are such that they engage against tension of the flexible member, but allow lateral displacement of the flexible member relative to the cradle, in the absence of other constraints.

Preferably the fixing portion comprises a pair of tabs having support surfaces for pressing on a mounting surface in use, the support surfaces being substantially on a plane, with the cradle and flexible member being wholly located to one side of the plane.

Preferably the retaining member extends between the tabs of the fixing portion.

Preferably the clip is slidably adjusted relative to said support.

Preferably the fixing portion or a said support, or both, comprise indexed formations for indexed positioning of said clip and said support.

Preferably the fixing portion comprises of an indexed formation or set of indexed formations having support surfaces for reciprocal engagement or receipt, in use, with a mounting surface comprising a reciprocally indexed formation or set of indexed formations.

More preferably the fixing portion further comprises of at least one and preferably a pair of additional support surfaces disposed toward or at one or each end of the indexed formations, the additional support surfaces for location upon or engagement with one or more surfaces of the mounting surface in use.

Preferably the fixing portion comprises a pair of additional support surfaces, a first of the pair of additional support surfaces comprises a pair of lugs disposed toward or at a first end of the fixing portion.

More preferably, the lugs are configured to be inserted into (or received by) a respective pair of lug recesses of the mounting surface.

Alternatively the lugs or the lug recesses, or both the lugs and the lug recesses, are shaped or configured so as to locate and/or retain the lugs, and optionally allow for a relative rotation of said respective lug and lug recess.

Preferably a or each said lug is swiveling or rotatable relative to the mounting surface or a said lug recess. Alternatively, a or each said lug comprises a rotatable or swiveling element(s) or a pivoting element or point with respect to the clip, or the lug recesses comprises a rotatable or swiveling or a pivoting element(s) or point, or each of said lugs and said lug recesses comprises a said rotatable or swiveling or pivoting element(s) or point.

Preferably each of said lugs may project toward each other, with a gap between their opposing surfaces so as to provide for a clamping region, the mounting surface with the lug recesses to be received within the clamping region.

Preferably the lugs are dimensioned so as to project into said respective lug recesses.

Preferably engagement of the lugs with the lug recesses facilitates a retention or connection of the first end of the fixing portion to a mounting surface.

Preferably the clip is swiveling or rotatable or pivoting with respect to a connection point of the lugs with said lug recesses yet maintains a connection with said mounting surface.

Preferably the clip may be swiveled or rotated or pivoted away from said mounting surface in a manner so as to disengage indexed formations of said clip from indexed formations of said mounting surface.

Preferably a second of the pair of additional support surfaces comprises a pair of tabs disposed at or toward a second end of said fixing portion.

Preferably one or each of said tabs is shaped or includes a surface formation to locate with or engage (or connect) with a said mounting surface.

Preferably the shaping or surface formation of the or each said tab is configured to engage with the mounting surface, in use, allowing for a relative ease of connection and disconnection, in use, by a user, yet which is restrained sufficiently so as to preferably avoid an unintended disconnection.

Preferably haptic feedback may be generated from one or more of: engagement or location or connection of one or each said lugs with said lug recesses, engagement or location or connection of one or each said shape or surface formation of a tab with said mounting surface.

Preferably the additional support surfaces extend from the fixing portion in a direction that is away from the retaining member and the fixing portion.

Preferably the additional support surfaces extend a distance such that their respective location or engagement with the mounting surface is made in conjunction with the simultaneous engagement or mating of the indexed formations of the fixing portion with the reciprocally indexed formations.

Preferably the mounting surface is a rail.

Preferably the rail is mountable to another surface or mounting surface.

Preferably the mounting surface, when in the form of a rail, can be provided as a part of an adjustable clip and mounting assembly.

Preferably said assembly provides for a combination of the indexed formations and the reciprocal indexed formations and for the relative positioning of the fixing portion (and therefore the clip) to the mounting surface.

Preferably the mounting surface as a rail comprises of a surface as a slide for receiving the indexed formations of the clip, or the surface is itself comprising of reciprocally indexed formations for reciprocal engagement with the indexed formations projecting from the fixing portion. More preferably, engagement of respective indexed formations of said clip and said mounting surface allows for an indexed positioning or adjustment of the clip and the mounting surface to each other and/or to provide a support of each part to the other.

Preferably the mounting surface as a rail can comprise of one or a series of apertures for receiving of a fastener. More preferably, the fastener is attachable or connectable to the mounting surface as a rail to a surface or another mounting surface (e.g. such as a wall, joist, gantry, soffit or other structure).

Preferably fasteners (whether penetrative or threaded) can be used to connect the fixing portion of another clip thereto.

Preferably the fixing portion comprises one or more fixing formations (e.g. an aperture) for receiving therethrough a fastener (whether penetrative of threaded) for connection to the mounting surface as a rail and through the apertures into a further mounting surface or a structure.

Preferably said apertures are located along a length of the mounting surface as a rail, and may optionally be centrally located (for example centrally located to extending along a length of said mounting surface as a rail).

Preferably the mounting surface as a rail comprises one or a series of said lug recesses. More preferably said lug recesses are located along a length of the rail, and optionally may be located along one or multiple edge regions of the rail for receipt of said lugs.

Preferably the mounting surface as a rail comprises of a stepped region along one or multiple edge regions substantially adjacent to the reciprocally indexed formations. More preferably said stepped region is structure for retaining or locating of the shaped or surface formation of one or both of said tabs extending from the fixing portion.

Preferably said mounting surface as a rail comprises at least one said clip in connection with a reciprocally indexed formation and at least one said clip in connection with said fixing formations. Preferably the cradle is supported in a condition spaced above the retaining member.

Preferably the retaining member is spaced from the plane.

Preferably the flexible member extends from a location adjacent one end of the cradle, but spaced below the surface of the cradle.

Preferably the cradle is defined by a concave wall member.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Figure 1:
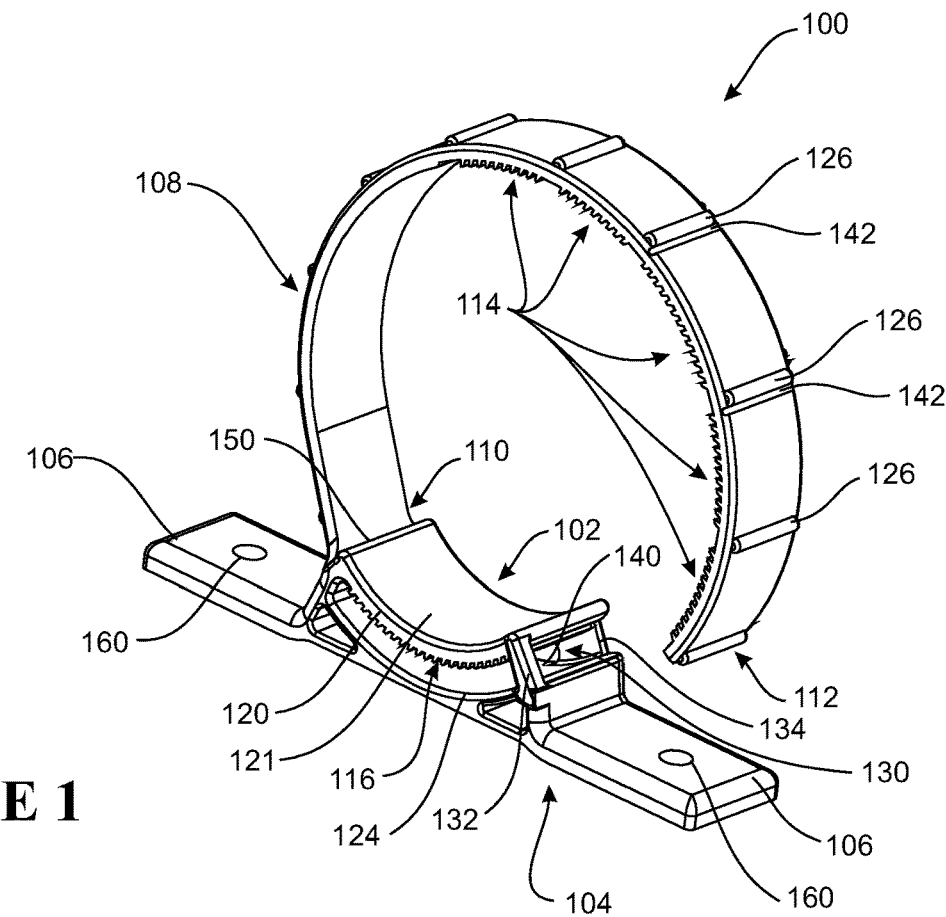
FIG. 1 is a view of a clip for securing an item according to a first clip embodiment suitable for securing to a surface that the item traverses, with the flexible member in an unengaged condition prior to use.

The present invention provides a clip that can be secured to a support and can engage with conduits of different sizes. The preferred clip has a range of features which provide additional advantages, as will be apparent when the features are described.

Two clips will be described in detail. The form of the clip portion is shared by both clips and will be described only once. Common parts of the clip portion will share the same reference numerals throughout. The two clips differ in their intended mode of attachment. One is for connecting to a flat surface that the conduit runs across or traverses. The other is for connecting to a surface that intersects the conduit, such as where a conduit passes across a series of posts or beams. This clip is intended to be fastened to the side of the post or beam rather than the face.

Figure 6:
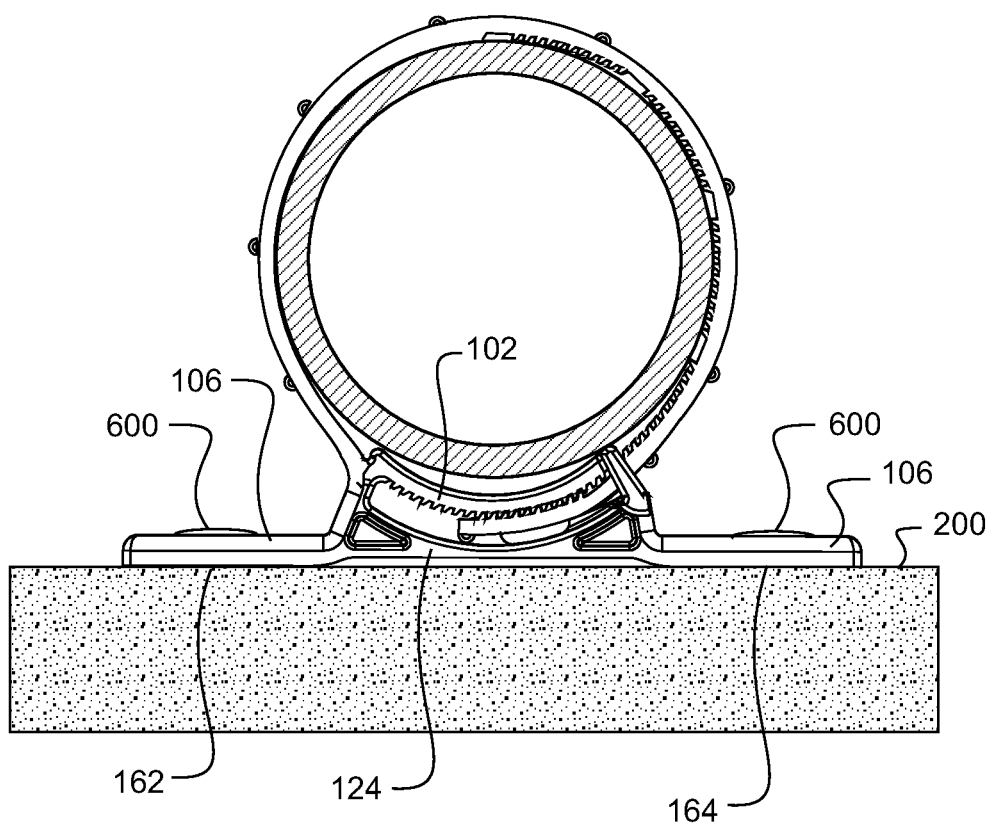
FIG. 6 is a side view of the clip of the first embodiment fixed to a wall surface and engaged with a conduit of a first size.
Figure 7A:
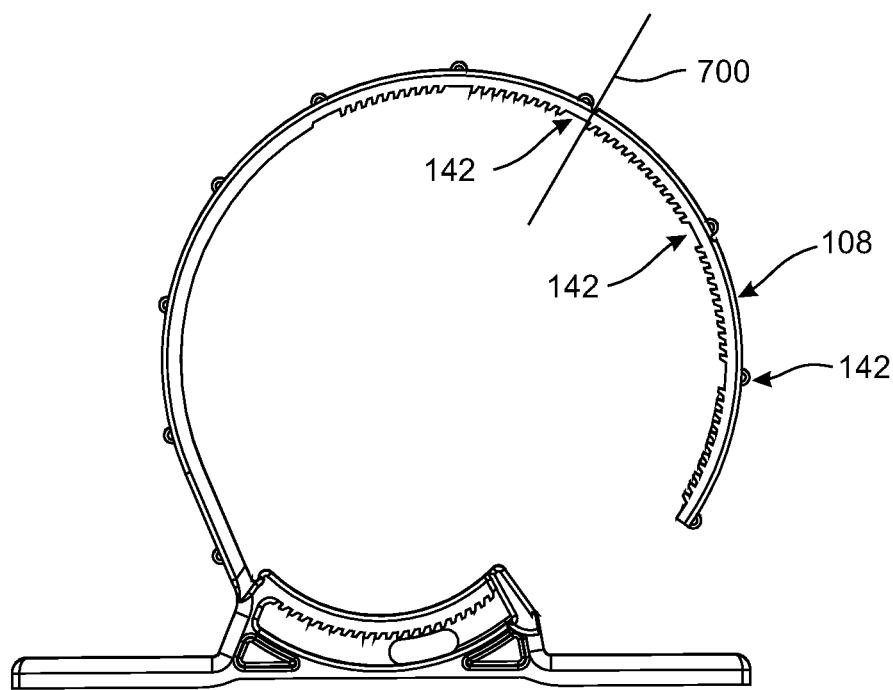
FIG. 7a is a side view of the clip of the first embodiment with the flexible member trimmed to a shorter length.

The first clip embodiment will be described with reference to FIGS. 1 and 2, and use of the clip will be described with reference to FIGS. 6 and 7.

The different aspects of the second clip embodiment will be described with reference to FIGS. 3 to 5 and 8.

Where we refer in the specification to a conduit this is merely for illustration. The conduit could be a pipe or cable or any similar item intended to be secured to a support.

Figure 2:
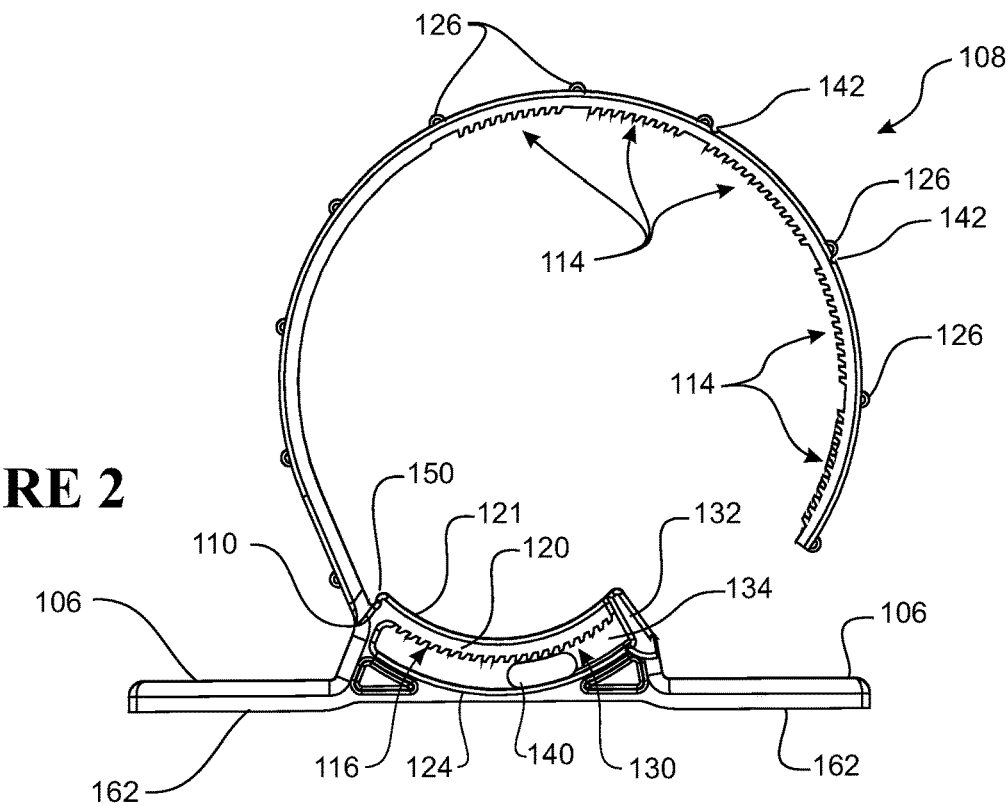
FIG. 2 is a side view of the clip of FIG. 1, to show details of the socket and the fixing portions of the connector.

Referring to FIG. 1, the clip 100 has a cradle portion 102 for receiving a surface of an item to be secured.

A flexible member 108 extends from a location 110 at or adjacent an end of the cradle portion 102.

The flexible member 108 has a free end 112. Formations 114 at or near the free end 112 are configured to engage with other formations 116 which are fixed in relation to the cradle portion 102. When the formations are engaged, the cradle portion 102 and the flexible member 108 define an enclosing loop. By this loop the flexible member 108 may hold an item against the cradle 102.

The clip also includes a fixing portion 104 with at least one tab portion 106 extending to be securable to a support. With the fixing portion 104 secured to a support such as a wall, and a conduit enclosed in the loop, the conduit is supported relative to the wall.

In the illustrated embodiment the formations 114 are formed along a length of the flexible member and the formations 116 are formed along a length of the cradle portion. More of the formations progressively engage as the free end of the flexible loop and the cradle overlap more and more by tightening of the loop. The formations have a form which prevents loosening of the loop through direct tension on the flexible member. An example of suitable formations is a series of teeth. Preferably the profile of the teeth is such that they will pass over each other when relatively moved in one direction, but hook onto each other when relatively moved in the other direction. For example each tooth may have a ramp face and a perpendicular or hook face.

In the illustrated embodiment the cradle 102 is formed as surfaces of an inwardly facing side 121 of a cradle member 120. The formations 116 that are fixed in relation to the cradle are located on an outwardly facing side of the cradle member 120. The formations 114 on the flexible member 108 are on an inwardly facing surface of the flexible member. In this way, with the flexible member formations and cradle member formations engaged, an item pressing on the cradle 102 (under force from the tightened loop) urges the cradle member formations 114 toward the flexible portion 108.

As well as supporting the conduit, the cradle forms part of a socket 130 that receives the free end of the flexible member 108. A retaining member 124 is spaced apart from the outwardly facing surface of the cradle member 120. The spacing is sufficient that the free end 112 of the flexible member 108 may pass between the retaining member and the cradle member.

The cradle member 120 is supported from one or more of the retaining member 124 and the fixing portion 104 by walls 132 and 134 at both sides adjacent an end of the cradle member 120. These walls 132,134, together with the cradle member 120 and the retaining member 124 define an entrance to the socket, into which the free end 112 of the flexible member 108 may be inserted.

The wall 132 at one side is brief relative to the length of the cradle member 120 and relative to the possible amount of insertion of the free end of the flexible member 108 into the socket. It may also be brief relative to the other wall 134. By brief, it is meant that the wall extends only a small part of the length of the cradle, or other wall, for example less than half the length of the cradle or less than half the length of the other wall. In particular the brief wall 132 may be present only in the region immediately adjacent the entrance to the socket. The brief wall may be the only wall on that side of the socket.

In use the brief wall 132 is frangible, and may be broken away either partially or completely (preferably by using a tool such as a screw driver, pliers or side cutters) to allow disengagement of the flexible member from the socket by a sideways movement, that would otherwise be blocked by the presence of the brief wall 132. The brief wall 132, being adjacent one end of the socket is reasonably accessible by a slender tool, even with a conduit engaged in the clip.

The other wall 134 includes an opening 140 on the opposite side from the brief wall 132, for example an opening in the other wall 134. The opening is spaced from the entrance to the socket. In use a slender tool may be inserted into the opening 140 to act against a portion of the flexible member 108 which is engaged within the socket 130, to push the flexible member sideways so it can be disengaged, after the brief wall 132 has been broken away.

The form and arrangement of the flexible member 108, the cradle member 120 and the retaining member 124 can be such that the engagement between formations 114 and 116 is enhanced by tension applied to the flexible member 108. For example, in one embodiment, the free end 112 of the flexible portion 108 has a stiffness sufficient that, when tension is applied to the flexible member 108, the outwardly facing surface or edge of the free end is pressed against the retaining member 124 by pivoting of the free end around an end of the cradle member 120 (at the entrance to the socket). In this way the more tension that is applied the more firmly the formations 114 of the flexible member and the formations 116 of the cradle member are engaged at or adjacent the fulcrum of this pivot.

In the illustrated embodiment the flexible member 108 is sufficiently stiff to be self supporting. In the illustrated embodiment the flexible member 108 extends in an arc generally away from the cradle portion 102 and fixing portion 104, across above the cradle 102 and back toward the cradle portion 102 and fixing portion 104. Of course the flexible member 108 is sufficiently flexible for the free end 112 to be moved away from the cradle 102 to open a space sufficient to receive a conduit or pipe. It may be sufficiently flexible to be bent to a condition extending straight away from the cradle or further back toward the supporting wall or structure.

The flexible member 108 is, in some embodiments, relatively long compared to the cradle 102. For example it may constitute more than half of the perimeter of the loop, or more than two thirds of the perimeter of the loop. This may be the case when the clip 100 is closed to suit a small diameter conduit. When the clip is closed to suit a larger conduit the flexible member may constitute a significantly greater part of the perimeter of the loop.

The flexible member 108 includes formations 114 distributed along the inner surface for engaging with formations 116 on the cradle member. These formations 114 may extend for a length greater than the length of the cradle member 120. Thus, in use an excess length of flexible member 108 may be trimmed off to allow a clip to be used for smaller conduits.

The formations 114 of the flexible member and the formations 116 of the cradle member are such that they engage against tension of the flexible member 108. In the preferred embodiments the formations are shaped to allow lateral displacement of the flexible member 108 relative to the cradle 102, in the absence of other constraints. The formations 114 and 116 may be a series of complementary wide and shallow teeth, the series extending along the flexible member 108 and the cradle member 120. The teeth may have steep (or perpendicular or hooked over) surfaces which butt each other to prevent extraction, and ramped surfaces which slide over each other during insertion. Other formations are possible, including other forms of teeth, or knobs and holes, or a single engagement on one part and a series of engagements on the other part.

As an alternative the teeth could be shaped to provide added security against disengagement. For example they could be shaped to resist sideways disengagement as well as direct tensile extraction. The teeth may for example extend at a slanting angle across the flexible member, so that the flexible member must undergo further tightening during the sideways displacement required for the teeth to disengage. Alternatively the teeth could have a more complex path, such as chevron or wavy path across the flexible member so that sideways disengagement is essentially precluded. Or the formations could be in some other form that does not allow for disengagement, such as a flexible pawl as part of the socket and a series of notches on the flexible member.

In the illustrated embodiment the flexible member 108 includes ribs 126 on its outward surface. In use the ribs 126 may assist a user to urge the flexible member 108 into greater engagement in the socket 130, helping the user tighten the loop and more tightly secure the item in the clip. In the illustrated embodiment the flexible member includes at least one zone intended for cutting. The cutting zone may be a zone which is thinner or narrower. In the illustrated embodiment the cutting zone 142 does not have the teeth or other engagements that are present either side of the zone. This essentially defines a region of reduced thickness. In the illustrated embodiment one or more of the cutting zones 142 also include a shallow groove across the width of the flexible member. In use the member may be shortened to a cutting zone by a user with appropriate tool such as scissors or side cutters.

In the illustrated embodiment there are a series of zones 142 for cutting. Each zone 142 is adjacent a rib 126 on the outer surface of the flexible member. The zone for cutting is located along the flexible member 108 between the rib 126 and the free end 112. This provides that an outwardly extending rib is located adjacent the new free end of the flexible member after the member 108 is trimmed to one of the cutting zones. This is illustrated by line 700 in FIG. 7a. This rib, and any other ribs that enter the socket, runs on the surface of the retaining member 124, which assists to pivot the inserted portion of the flexible member toward the cradle member, and so bring more of the formations of the socket and the flexible member into an engaged condition. The trimmed flexible member is then a suitable length for securing smaller diameter conduit, such as conduit 702 in FIG. 7B.

In the illustrated embodiments the spacing of the zones for cutting is shorter than the depth of the socket 130 so that the flexible member does not usually require shortening at a location other than one of the cutting zones.

In the illustrated embodiments the cradle is defined by a concave wall member 120. This concave wall member 120 preferably has a curvature tighter than the curvature of the flexible member 108 has, at least with the flexible member in its unengaged condition. Preferably the concave wall member has a curvature that is between the smallest diameter conduit that the clip is intended to support and the largest diameter conduit that the clip is intended to support. The concave wall member 120 preferably ends without sharp corners, for example with radiused corners, to reduce the pinpoint loads that might be imposed on a secured conduit of larger diameter. The cradle could be provided by other supporting forms. For example the cradle could comprise a series of two or more members extending across the width of the clip.

In the illustrated embodiments the flexible member 108 extends from a location 110 adjacent one end of the cradle 102, but spaced below (or back from) the inwardly facing surface 121 of the cradle. This step back 150 helps to positively locate the supported conduit onto the cradle 102, rather than against the root of the flexible member 108. In this way the angle of the strap is sufficiently adaptable to different conduit diameters by flexing in the length of the flexible member that is between its connection with cradle and its contact with the conduit. This action can make easier the tightening of the loop, and lower stresses on the flexible member. In addition the area where the flexible member leaves the cradle includes sufficient fillet or radius to alleviate the stress raising sharp corners.

Figure 7B:
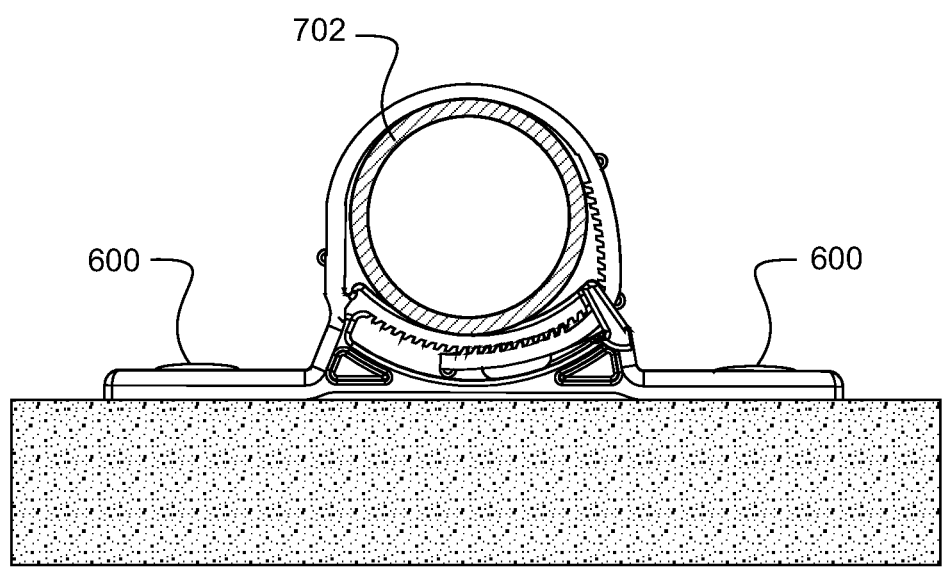
FIG. 7b shows this clip fixed to a wall surface and engaged with a conduit of a second size.
Figure 8:
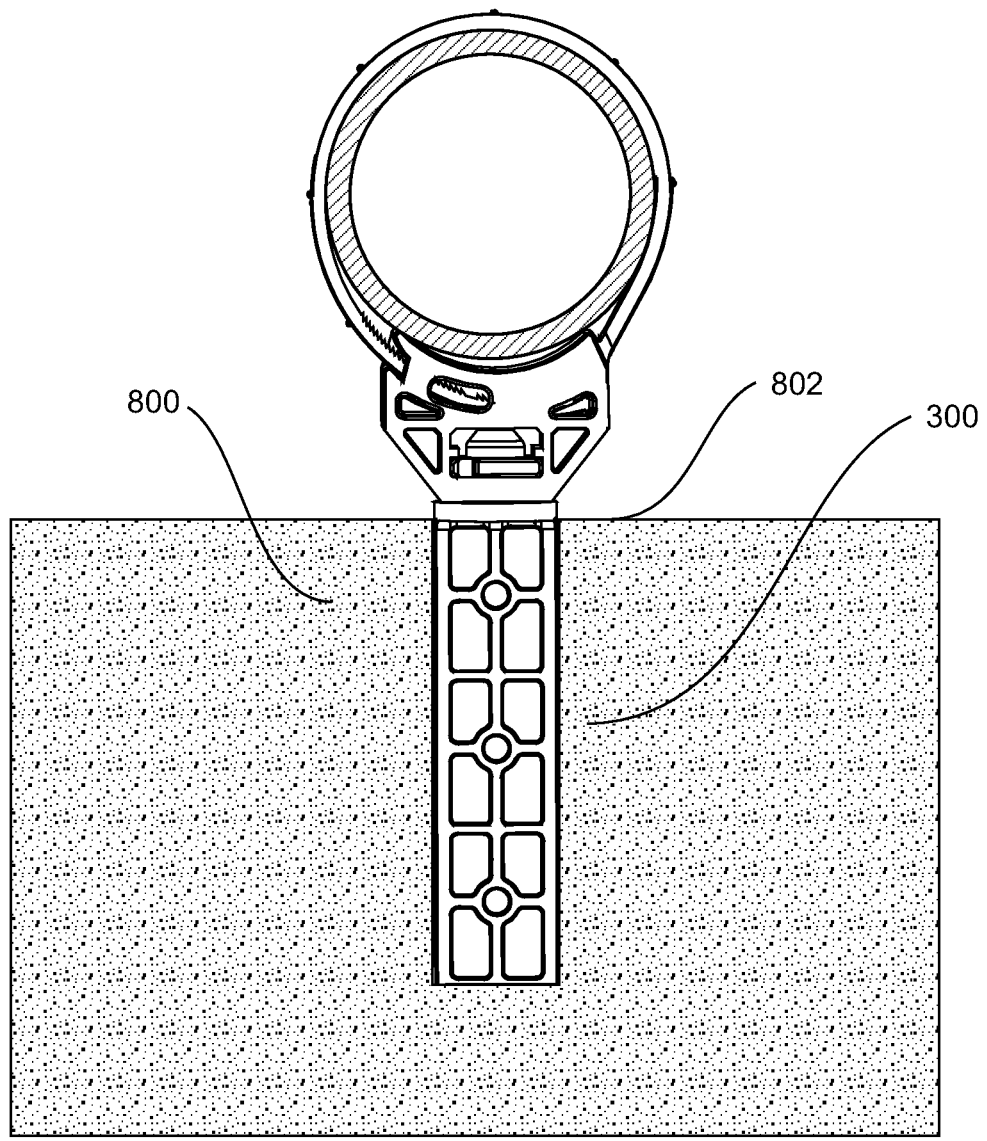
FIG. 8 is a view of a clip according to the second embodiment fixed to a support and engaged with a conduit.
Figure 9:
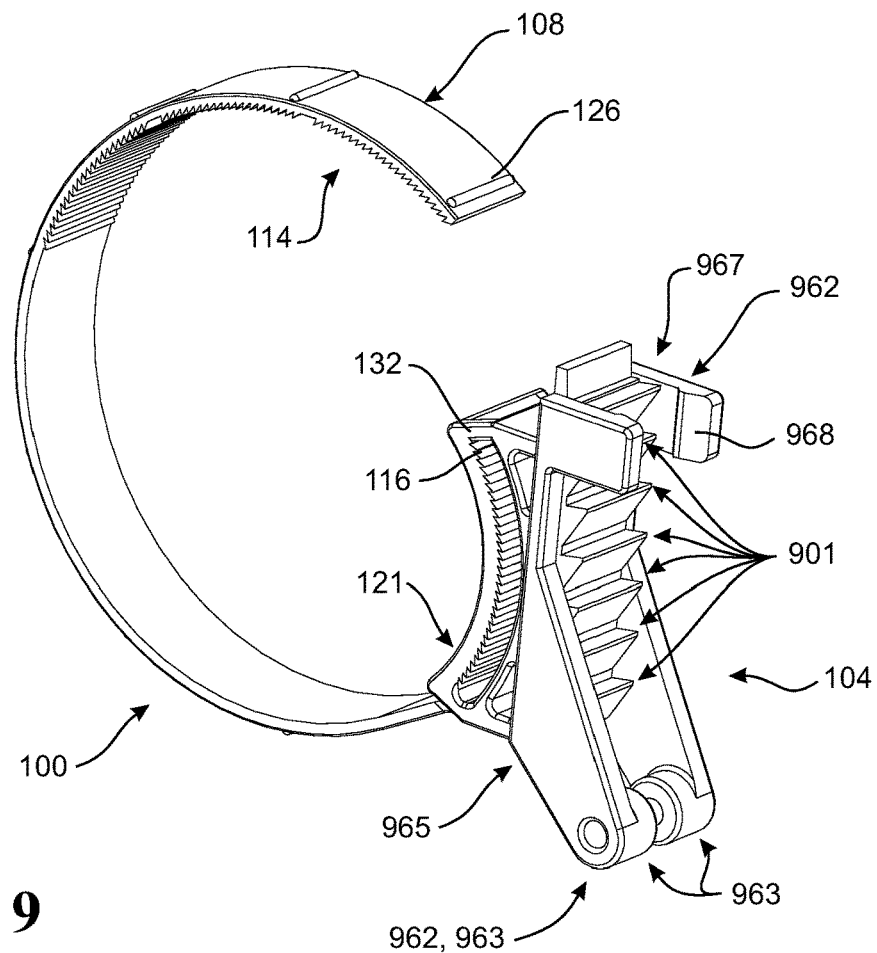
FIG. 9 is a perspective view of another embodiment of a clip, such as that which may be attached to a mounting surface in the form of a rail.
Figure 10:
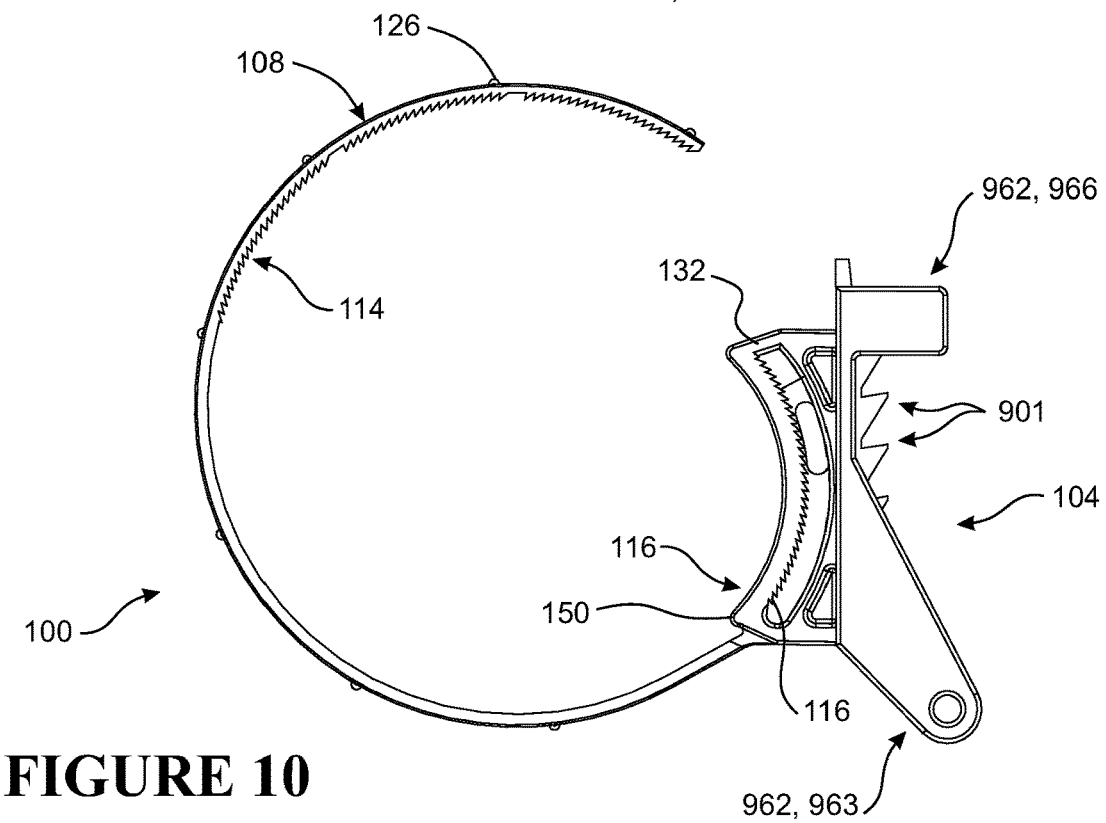
FIG. 10 is a side view of the clip of FIG. 9.
Figure 11:
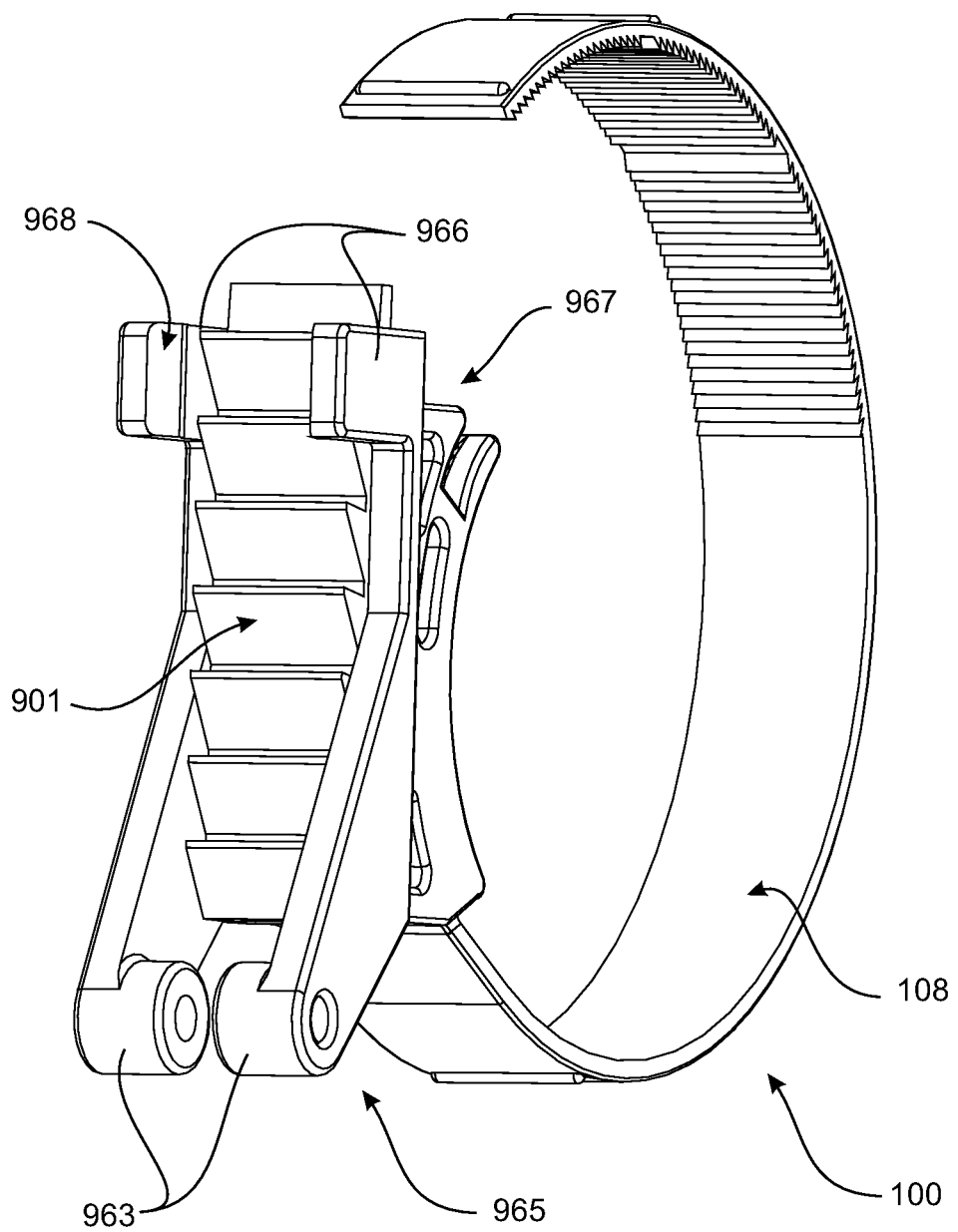
FIG. 11 is another perspective view of the clip of FIGS. 9 and 10.

In the illustrated embodiments of clip the fixing portion 104 includes at least one tab portion 106 extending away from the cradle 102. The tab portion 106 includes a fixing formation 160 (for example a lug, pin, recess or hole). In some embodiments the tab portion includes more than one fixing formation. In use, as illustrated in FIGS. 6, 7B and 8, the tab may be secured to a supporting surface or structure by a suitable fastener, such as a screw 600 through a hole.

In the embodiment of clip illustrated in FIGS. 1, 2, 6 and 7 the fixing portion comprises a pair of tabs 106 extending in opposite directions from the cradle 102. The tabs have support surfaces 162 for pressing on a mounting surface (for example surface 200 in FIG. 6) in use. The support surfaces 162 are substantially on a plane, and the cradle 102 and flexible member 108 are wholly located to one side of the plane, so that when the support surfaces 162 are against a flat surface, it is the support surfaces 162 that will contact the flat surface, not the cradle 102 or flexible member 108.

In this configuration, in the illustrated embodiment of FIGS. 1, 2, 6, and 7, the retaining member 124 extends between the two tabs 106 of the fixing portion, and the cradle 102 is supported in a condition spaced above the retaining member 124.

In the illustrated embodiment of FIGS. 1, 2, 6, and 7 the back surface of the retaining member 124 is spaced from the plane of the support surfaces 162 of the tabs 106. This allows the clip to accommodate uneven surfaces, and may also help the clip to flex.

In the embodiment of clip illustrated in FIGS. 3 to 5 and 8, the fixing portion 104 comprises a tab 300 extending from the cradle 102 in a direction such that a support surface 302 of the tab 300 is on a plane that would intersect the supported conduit. So, for example, the tab 300 forms a supporting post extending away from the loop of the clip, which can be used to space the loop of the clip away from a support structure. Furthermore, as illustrated in FIG. 8, the tab 300 can be fixed to a side face 800 of a structure where the conduit runs across an outer face 802 of the structure. Such a clip can find particular use in securing conduit to structural building members such as joists, rafters, studs, nogs or posts.

The fixing portion of the clip may be movable relative to the cradle. For example, in the embodiment illustrated in FIGS. 3 to 5 and 8, the tab 300 may be rotatable on an axis chosen such that the plane of the tab and the plane of the loop can be generally parallel, or generally perpendicular or other angles between. This allows a clip secured, for example, to the side face of a joist or rafter and, protruding beyond the edge of the joist or rafter, to support a conduit running at any angle across the edge face of the joist or rafter.

Figure 3:
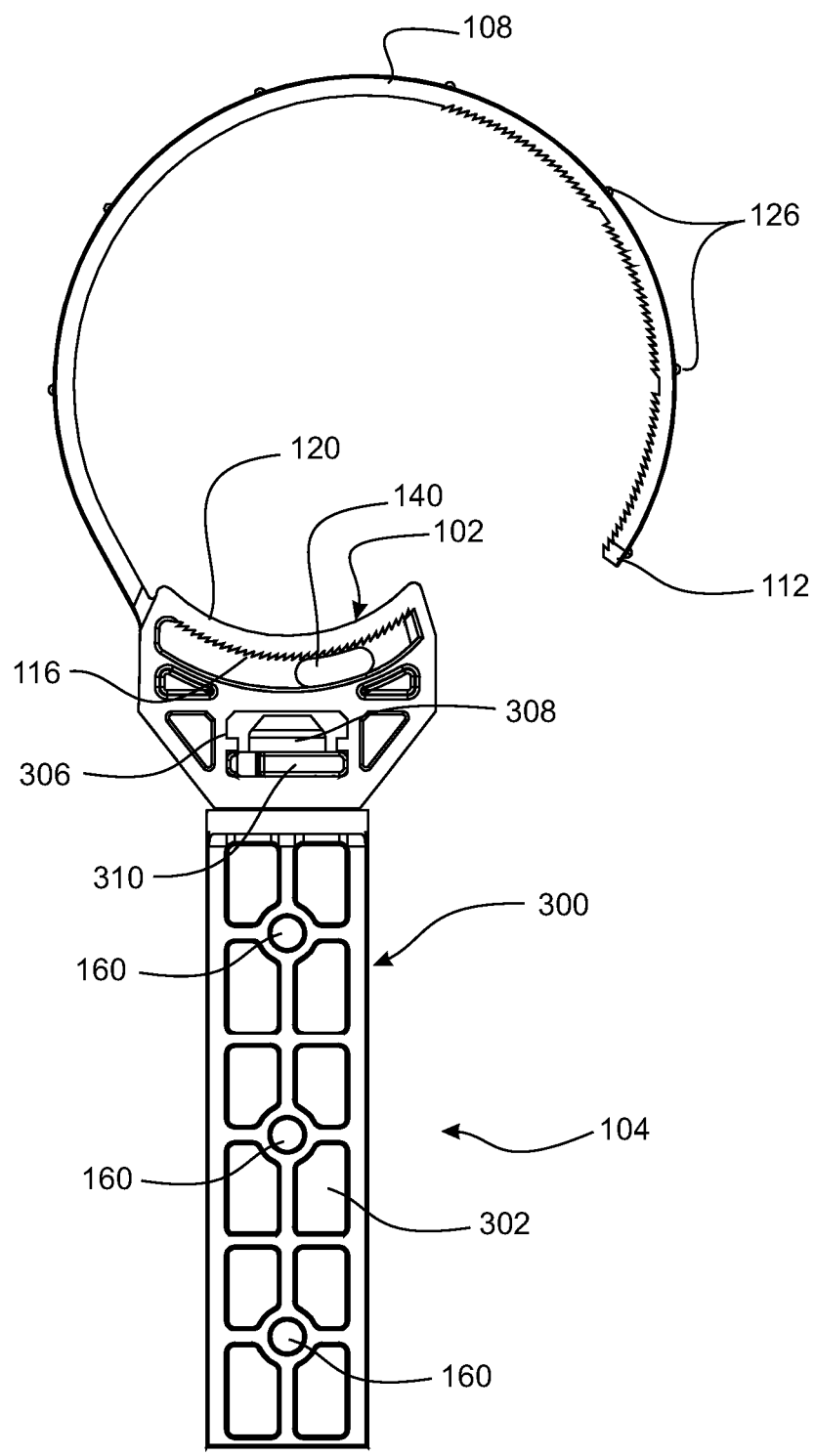
FIG. 3 is a view of a clip for securing an item according to a second embodiment, suited for connection to a surface that intersects the path of the item, with the flexible member in an unengaged condition.
Figure 4:
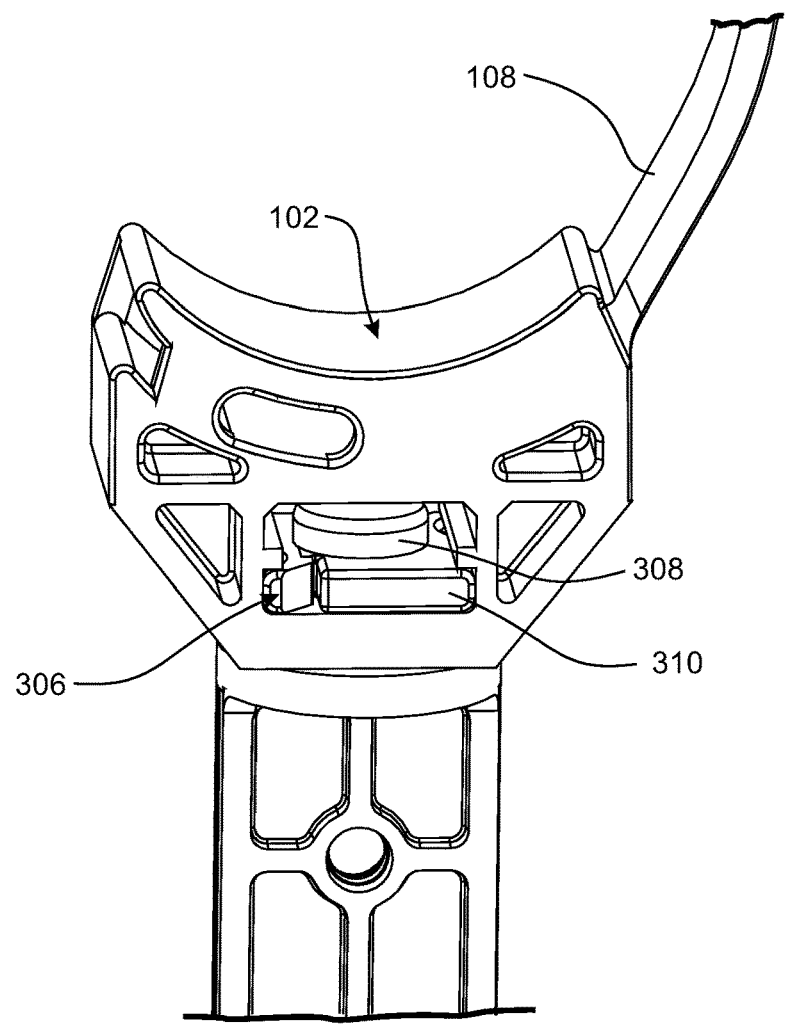
FIG. 4 is a closer view of the connection between the fixing portion of the second embodiment and the clipping portion.

In the embodiment of FIGS. 3, 4 and 8, the clip is made in more than one part, and these parts are secured together after being made, for example by integrated connection features, or by some additional securing member. In the embodiment illustrated in more detail in FIG. 4 the clipping portion includes a socket 306 and the fixing portion includes a knob 308. The knob 308 engages in the socket 306. The disposition of the socket and knob could be reversed. The knob may be engaged in the socket by inherent form (for example so that they are engaged in most alignments, but may be withdrawn in one alignment), or by elastic deformation during engagement, or by plastic deformation after engagement (such as mushrooming the end of the knob), or by securing by some form of fastener.

Figure 5:
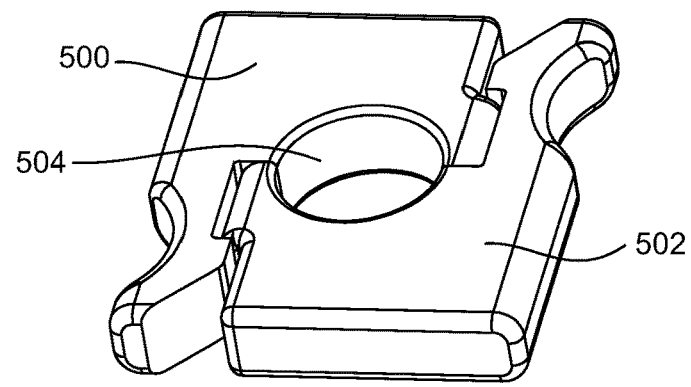
FIG. 5 is a view of a split washer arrangement that holds the fixing portion to the clipping portion.

In the illustrated version the knob 308 is secured by a split washer 310, the form of which is illustrated in more detail in FIG. 5. The split washer 310 is itself made in two parts 500 and 502 that engage with each other (or with the socket 306, or both). The opening 504 in the completed washer is smaller than the opening of the socket through which the knob passes, and smaller than the lateral extent of the knob end. The washer 310 prevents the knob 308 being removed from the socket 306. Other forms of a washer type clip (such as a split ring or circlip), or a split pin or similar fastener, could serve to keep the knob from removal from the socket. The illustrated arrangement has the benefit of presenting suitable load bearing surfaces to both the back surfaces of the knob end, and to the internal surfaces of the socket.

In some embodiments, such as illustrated in FIGS. 1, 2, 6, and 7, the clip does not have a movable fixing portion, the cradle member, the flexible member and the fixing portion are all formed from a plastic material as a single body.

In some embodiments, via the fixing portion 104, the clip can be slidably adjusted relative to a mounting surface 903 (e.g. a rail 1000). The adjustment of the fixing portion 104 to the mounting surface 903 (e.g. rail 1000) may be of an indexed form, such as via indexed formations. In this manner, a series of pre-disposed locator points along the mounting surface (or rail 1000) can be situated.

The formations may be longitudinally indexed (i.e. along its indexing length) according to a predetermined set of dimensions and step points.

The index formations may be a series of steps or toothed projections from the mounting surface 903.

In some embodiments, such as illustrated in FIGS. 9-15, the clip does not have a movable fixing portion.

Figure 15:
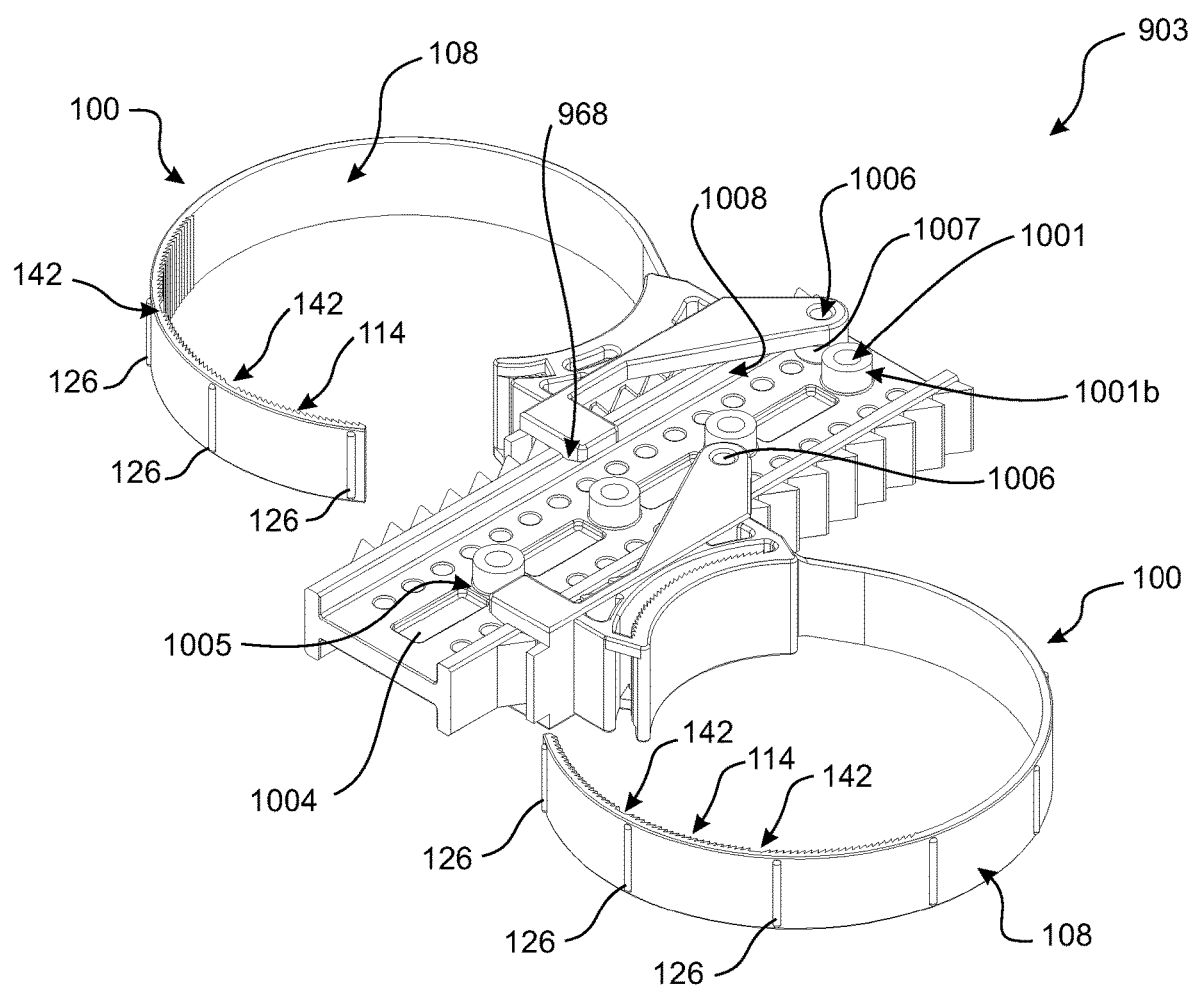
FIG. 15 illustrates an alternative embodiment of the assembly of FIG. 12.

Illustrated in FIGS. 9-14 is another embodiment of the clip where the fixing portion 104 comprises of an indexed formation or set of indexed formations 901 having support surfaces 902 for reciprocal engagement or receipt, in use, with a mounting surface 903 comprising a reciprocally indexed formation or set of indexed formations 904. The embodiment of FIG. 15 is a still further embodiment, notably where bosses or a form of extended projection 1001*b* are provided to facilitate additional structural support for any fasteners (not shown) which may be put through the aperture 1001 to fasten or affix support surface to a member or further support surface.

The fixing portion 104 may further comprise of at least one and preferably a pair of additional support surfaces 962 disposed toward or at one or each end of the indexed formations 901, the additional support surfaces 962 for location upon or engagement with one or more surfaces of the mounting surface 903 in use.

In some embodiments, as shown by the clip of FIGS. 9-13, 15 a pair of additional support surfaces 962 is provided, a first of the pair of additional support surfaces 962 comprises a pair of lugs 963 disposed toward or at a first end 965 of fixing portion 104. The lugs 963 configured to be inserted into (or received by) a respective pair of lug recesses 964 of a mounting surface 903, or alternatively to provide for location of an exterior surface 1007 of the said lugs adjacent or substantially in contact with an inside rail surface indicated as item 1008 in the figures. In this manner, the lugs may facilitate for a slidably locatable clip with respect to the mounting surface 903 or more particularly as the rail 1000. It will be appreciated the lugs may be more securely fastened to the rail by a fastener which can extend through the aperture 1006 of each such lug, through a lug recess (which then becomes an associate lug aperture previously labelled as item 964), and through the other lug and lug aperture residing on the other side of the mounting surface or rail 1000. Such a fastener may be a threaded fastener or an adjustable fastener allowing for tightening for more secure location and retention of the clip to the mounting surface, or via versa when a re-positioning of the clip to the mounting surface is desired.

Similarly, it will be appreciated a portion of each said lug may be allowed to at least partially project into a lug recess to provide for a positive location of lug with a lug recess and provide for an improved fit and alignment of the respective apertures 1006 with 964.

Optionally, the lugs 963 or the lug recesses 964, or both the lugs 963 and the lug recesses 964, are shaped or configured so as to locate and/or retain the lugs, yet allow for a relative rotation of these parts. For example, the lugs 963 can be configured to swivel or rotate relative to the mounting surface 903. In an alternative embodiment, the lugs 963 may themselves comprise rotatable or swiveling element(s) or pivot point with respect to the clip, or the lug recesses 964 may comprises such rotatable or swiveling element(s).

According to the above embodiment, the lugs 963 may project toward each other, with a gap between their opposing surfaces so as to provide for a clamping region, the mounting surface with the lug recesses 964 to be received within the clamping region. The lugs 963 can be dimensioned so as to project into respective lug recesses 964 and provide an effective clamping of the mounting surface 903.

According to the above embodiment, engagement of the lugs 963 with the lug recesses 964 can facilitate a retention or connection of the first end 965 of the fixing portion 104 to a mounting surface 903. The swiveling or rotatable capability can facilitate maintenance or an enduring retention or connection of the fixing portion 104 to the mounting surface 903, yet allow for the clip and indexed formations 901 to be angled or moved away from engagement (whether a full or partial engagement) with the reciprocally indexed formations 904 of the mounting surface 903.

In some embodiments, as shown by the clip of FIGS. 9-13, 15 a second of the pair of additional support surfaces 962 comprises a pair of tabs 966 disposed at or toward a second end 967 of fixing portion 104. Each of said tabs 966 is shaped or includes a surface formation 968 to locate with or engage with a said mounting surface 903.

The shaping or surface formation 968 of the tabs 966 is configured to engage with the mounting surface 903 in a way which allows for a relative ease of connection and disconnection, in use, by a user, yet which is restrained sufficiently so as to preferably avoid an unintended disconnection.

Haptic feedback can be provided to a user to provide confirmation of when one or both of the first and second additional support surfaces 962 are correctly located or become engaged with the relevant portions of the mounting surface 903. For example, an audible click or snap-type fitment of the lugs 963 or tabs 966 may be generated once engaged with the associated portions of the mounting surface 903.

The additional support surfaces 962 preferably extend from the fixing portion 104 in a direction that is away from the retaining member 124 and the fixing portion 104.

The additional support surfaces 962 preferably extend a distance such that their respective location or engagement with the mounting surface 903 is made in conjunction with the simultaneous engagement or mating of the indexed formations 901 of the fixing portion 104 with the reciprocally indexed formations 904.

The mounting surface 903 can be provided as a rail 1000. The rail 1000 can be mounted to a surface, such as a wall ceiling, soffit, floor, joist, gantry or any other structure.

Advantageously, the mounting surface 903 when in the form of a rail 1000 can be provided as a part of an adjustable clip and mounting assembly. The combination of the indexed formations 901 and the reciprocal indexed formations 904 allows for the relative positioning of the fixing portion 104 (and therefore the clip 100) to the mounting surface 903.

The mounting surface 903 as a rail 1000 comprises of a surface as a slide for receiving the indexed formations 901 of the clip, or the surface is itself comprising of reciprocally indexed formations 904 for reciprocal engagement with the indexed formations 901 projecting from the fixing portion 104. Engagement of these relative indexed formations allows for an indexed positioning or adjustment of the clip and the mounting surface to get other, and to a degree a level of support of each part to the other.

The mounting surface as a rail 1000 can comprise of one or a series of apertures 1001 for receiving of a fastener. The fastener can be used to attach or connect the mounting surface as a rail 1000 to a surface, such as a wall, joist, gantry, soffit or other structure. In some embodiments, the apertures 1001 may be modified to include a projection or other structure such as a bossed arrangement 1001b. In this manner, a fastener or other securement device which is provided through the aperture 1001 has increased structural capabilities and may help to reduce or ameliorate deflection or distortion or other bending or geometric variance in the shape of the mounting surface 903, particular when as a rail 1000. Changes in shape of the rail 1000 may impede the ability for the clip to be slidably re-positioned or re-located along the mounting surface or rail 1000, particularly if there has been a deflection or distortion of the stepped regions 1003.

In addition, fasteners can be used to connect the fixing portion 104 of another of the clip embodiments thereto. For example, the fixing portion 104 as shown in FIGS. 1, 3, 4 itself has a fixing formation 160 (e.g. an aperture) for receiving therethrough a fastener which can be connected to the mounting surface as a rail 1000 and through the apertures 1001 into a structure. The apertures 1001 (whether with or without bosses 1001b) can be located along a length of the rail 1000, and may be centrally located.

In some embodiments, where bosses 1001b are associated with the apertures 1001, the rail 1000 may be provided in a laddered formation, for example with the indexed formations 904 being provided on opposing sides or surfaces of the rail, with a series or sections or bridges or rungs 1005. Each of the sections or bridges or rungs 1005 may be longitudinally displaced from each other (i.e. in a laddered formation) with a series of cut-out portions 1004 interposed between. The laddered formation may provide for increased structural rigidity, in association with bosses 1001b. As such, material may be removed from other regions of the rail 1000 to minimise the quantity of material used in manufacture of such a rail. It will be appreciated the cut-out regions may themselves provide a user with additional voids or apertures through which fasteners may be inserted, or alternatively may provided a user with additional access points for use when putting such a rail 1000 into use.

In relation to FIG. 15, a top perspective view has been provided, although the underside view would be identical in terms of showing detail.

The mounting surface as a rail 1000 can comprise of one or a series of lug recesses 964. Such lug recesses can be located along a length of the rail 1000, and may be located along one or multiple edge regions 1002 of the rail 1000 for receipt of lugs 963.

The mounting surface as a rail 1000 can comprise of a stepped region 1003 along one or multiple edge region 1002 substantially adjacent to the reciprocally indexed formations 904. Such a stepped region 1003 can provide a suitable structure for retaining or locating of the shaped or surface formation 968 of a tab 966.

In other embodiments, the one of the fixing portion 104 or the mounting surface 903 may comprise of indexed formations, and the other of the fixing portion 104 of the mounting surface may comprise of a member (not shown) reciprocally engageable with a said indexed formation, i.e. both parts may not necessarily comprise of a plurality of indexed formations. In such an embodiment, provision can be made for at least one clip 100 (e.g. that embodiment of FIGS. 1-8) to be fixed or fastened to the mounting surface 903 (i.e. rail 1000) via commonality of fixing formation 160 of a first fixing portion 104 with apertures 1001 of the mounting surface 903, and at least one additional clip 100 (e.g. that embodiment of FIGS. 9-13) to be engaged with the mounting surface 903 (i.e. rail 1000) and their associated indexed formation(s) 901, 904 and associated fixing portions 962. In this manner, a system or assembly for provision of a plurality of clips 100 oriented in different planes can be provided for supporting of a member such as a pipe, conduit or cable which may be securely retained by the flexible member 108.

Figure 12:
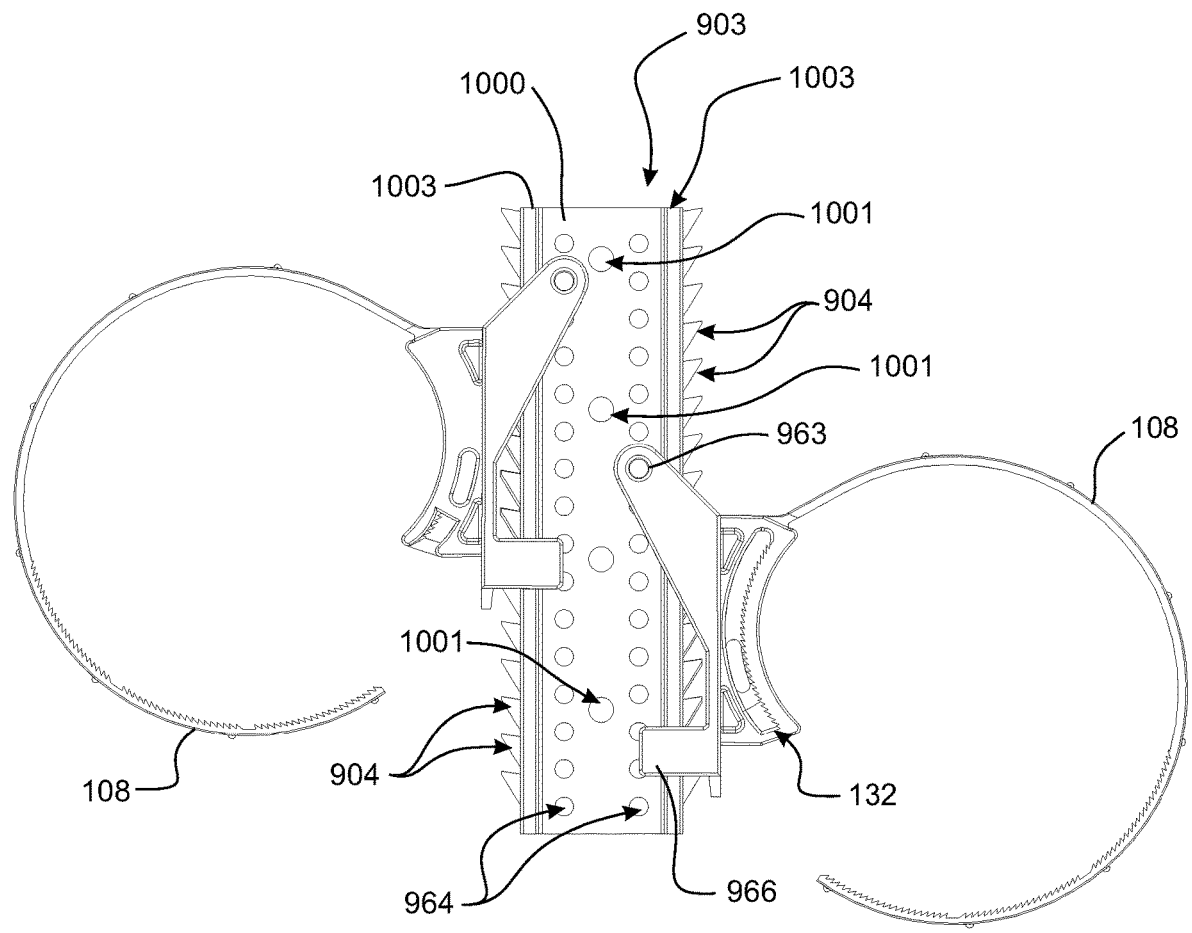
FIG. 12 illustrates a side view of an assembly of a pair of clips of FIGS. 9-11 attached to a mounting rail.
Figure 13:
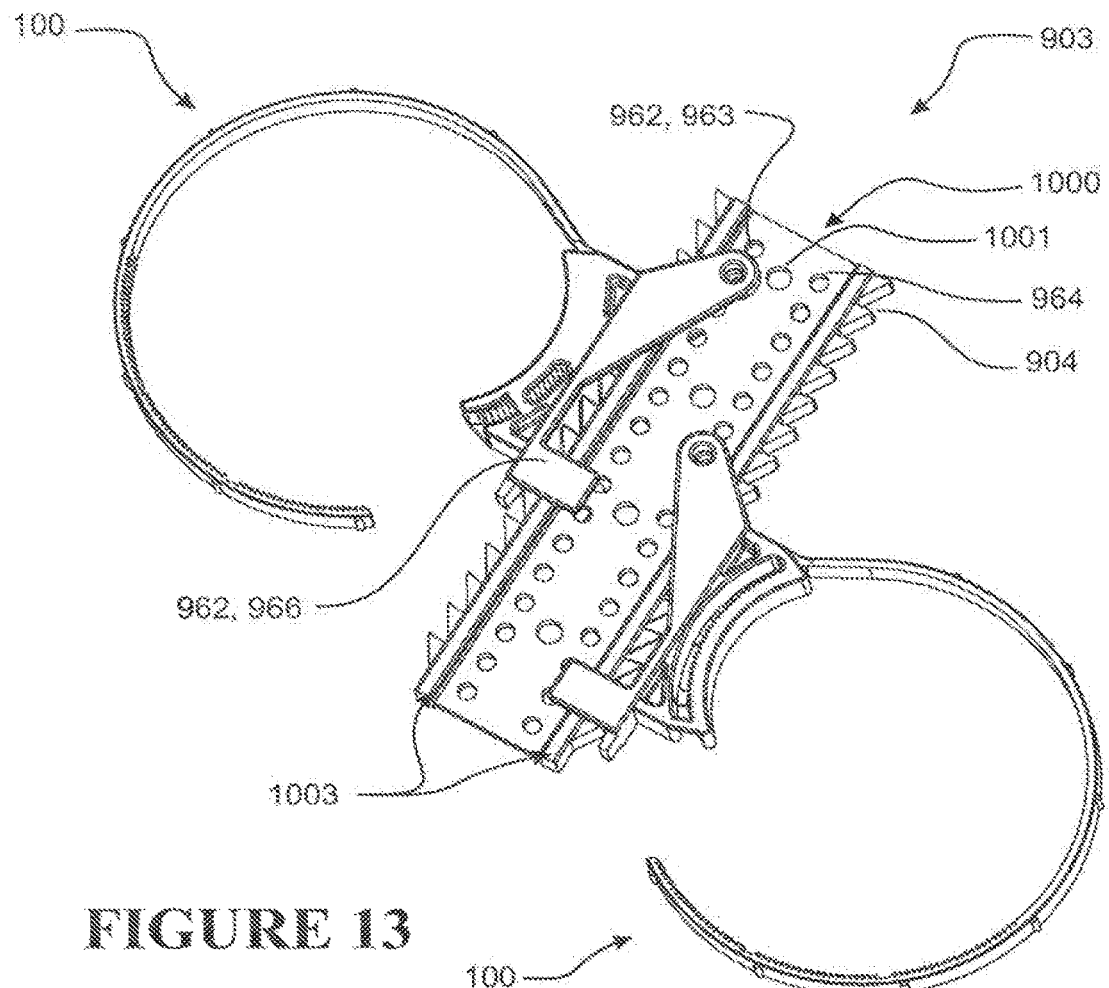
FIG. 13 illustrates a perspective view of the assembly of FIG. 12.
Figure 14:
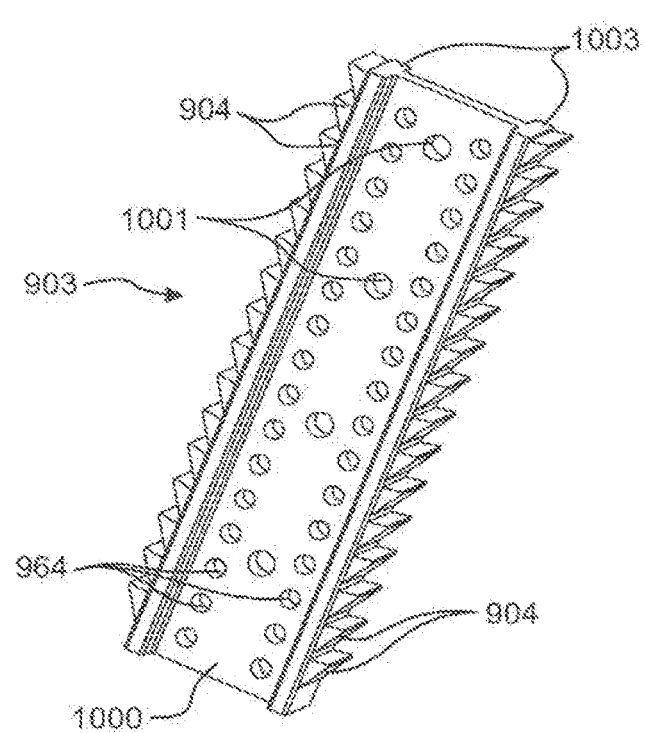
FIG. 14 illustrates a mounting surface in the form of a rail.

Although the arrangements of FIGS. 12, 13 and 15 show a rail 1000 with attached clips, being in one preferred orientation (i.e. where lugs 963 are positioned in-use to be above the tabs 966 when mounted on a rail in a vertical position, it will be appreciated such orientation of clips on the rail in-use may be varied and may, for example, be reversed (i.e. lugs 963 may be at the bottom of the clip when in the indexed position with the rail, and the tabs 966 may be above these, again when in a vertical orientation of the rail).

In the various embodiments described and illustrated herein, it will be appreciated a greater number of ribs 126 may be provided. Increasing the frequency and number of ribs 126 positioned along a length of the flexible member 108 may help to reduce variance or tolerance in the connection of the associated teeth 114 with those formations or teeth 116 of the cradle.

In yet further embodiments, a numerically associated index may be provided for the indexed formations along the mounting surface or rail so as to provide a user with an indication of the length of adjustment of a clip relative to the mounting surface or rail 1000. A scale or other guides may be provided along the length of a rail 1000.

Two or more rails 1000 may be connected to each other to provide for an extended rail system. A connector (not shown) may be provided for securing the ends of a pair of rails together in a manner which still allows for a clip connected to the rail 1000 to straddle the ends (and the jointed connection) of these rails. As such, it will be appreciated a plurality of rails can be provided in jointed connection with each other for rail lengths as desired by a user. Such a connector (not shown) may connect to each end of the rails through associated male and female parts on the connector and rails themselves. Alternatively, other connector systems may be utilised, preferably such that there is no impedance to the ability to adjustably slide a clip along a rail, through a jointed connection and onto a connected rail.

In other embodiments the parts of the clip may be formed from a plastic material. The plastic may be, for example, selected from the following: plastics/polymers of the types such as: polypropylene (PP), polyethylene (PE), polyvinyl chloride (PVC), acrylonitrile-butadiene-styrene (ABS), thermoplastic elastomers (TPE), including Styrenic block copolymers (TPE-s), polyolefin blends (TPE-o), Elastomeric alloys (TPE-v or TPV), thermoplastic ployurethanes (TPU), Thermoplastic copolyester, Thermoplastic polyamides, nylons, acetal polymers, polycarbonates, thermoplastics, polyurethanes It is preferred that the clip be made of a lightweight and durable material which is able to accommodate some degree of flexion. Some examples of suitable materials are plastics/polymers of the types such as: polypropylene (PP), polyethylene (PE), polyvinyl chloride (PVC), acrylonitrile-butadiene-styrene (ABS), thermoplastic elastomers (TPE), including Styrenic block copolymers (TPE-s), polyolefin blends (TPE-o), Elastomeric alloys (TPE-v or TPV), thermoplastic ployurethanes (TPU), Thermoplastic copolyester, Thermoplastic polyamides, nylons, acetal polymers, polycarbonates, thermoplastics, polyurethanes or a very ductile metal e.g. soft temper aluminium.

The pipes which are to be located by the clip of this invention are those typically used in plumbing applications, but may also include other cables or accessories to be retained (e.g. a bundle of cables perhaps), and these may come in a variety of types and have differing wall thicknesses depending on the manufacturer, the pressure rating, the material used, the requirements of the particular application and/or the industry involved. Common types of pipes used are, copper, polybutylene or polymers of butylene, pex pipe (white) such as cross-linked polyethylene, PVC (poly vinyl chloride), multi-layer composite aluminium, galvanised metals, stainless steels.

Overall, the clip is intended to be used to hold pipes or conduits of a range of sizes. Nonetheless, each clip will accommodate only a range of size, and to suite all sizes of conduits will still require a range of clips. So, for example, a clip which has a fixing portion spanning about 100 mm, may have a cradle about 30 mm long, a flexible member about 160 mm long, and be able to accommodate conduit with an outer diameter ranging between 32 mm and 50 mm. For larger sizes of conduit a clip could have dimensions suitably scaled up. For smaller sizes of conduit the clip could have dimensions suitably scaled down.

So, for example, the loop can be at least 50 mm diameter.

Preferably, the clip is intended to hold a pipe or conduit of an outer diameter (OD) of about 80 to 100 mm, or about 100 to 150 mm. It will be appreciated the flexible member is of an appropriate length to accommodate such different pipe or conduit outer diameters.

In various embodiments, the width of the cradle may be any width necessary to suitably accommodate a pipe or conduit or other structure to be retained, and may preferably be about 20 to 30 mm, or may be about 22 to 25 mm.

In one specific embodiment, the clip may be sized and dimensioned to preferably accommodate pipes having an outer diameter (OD) of about 80 to 100 mm. In such a configuration, the length of the cradle portion may be about 30 mm, and the width of the cradle may be about 18 mm, the width of the flexible member may be about 14 mm. The required length of the flexible member depends on the size of the pipe to be accommodated, however for 80 mm OD pipes, a length of the flexible member may be about 270 mm and for 100 mm OD pipes, the length of the flexible member may be about 340 mm.

In another embodiment, for example where the clip may be sized and dimensioned to accommodate pipes having an outer diameter (OD) of about 100 to 150 mm. In such a configuration, the length of the cradle portion may be about 50 mm, and the width of the cradle may be about 18 mm, the width of the flexible member may be about 14 mm. The required length of the flexible member depends on the size of the pipe to be accommodated, however for 100 mm OD pipes, a length of the flexible member may be about 340 mm and for 150 mm OD pipes, the length of the flexible member may be about 485 mm.

In some embodiments, the formations on the flexible member may extend at least 60 mm along the flexible member (such that the loop will accommodate items with diameter variations up to approximately 18 mm).

In the other dimension, the clip may be any width sufficient to provide a desired level of strength. However, to provide the ability to disengage the clip, the width is preferably much smaller than the overall dimension. So for example the width of the clip could be less than about 10% of the length of the flexible member.

Flexibility, to an extent that does not detract from security and strength of the clip, is considered advantageous for allowing the clip to fully open to receive conduit (by bending up or back the flexible member), for allowing the clip to be readily closed, and for allowing some movement of the clip portion relative to the fixing portion to allow for imperfect placement of the clip or allow for unevenness of the surface to which the clip is secured. Flexibility arises from a combination of the material property (the stiffness of the plastic material and the degree of elastic yield possible with the material), and the dimensions and form of the parts of the clip. For example the flexible member is much longer than it is wide, and much wider than it is thick. In particular the thickness may only be 2 to 4 mm. The much larger width gives the flexible member lateral stability while it is quite bendable in the other direction (to allow a wide entry). Similarly, in the first embodiment the tabs of the fixing portion are also 2 mm to 4 mm thick, allowing them to flex adjacent the location that they connect to the cradle structure.

The foregoing description of the invention includes preferred forms thereof. Modifications may be made thereto without departing from the scope of the invention.

The invention claimed is:

1. A clip, for securing a portion of a cable or pipe, comprising:
   a cradle portion for receiving a surface of an item to be secured,
   a fixing portion with at least one formation extending to be securable to a support, and
   a flexible member extending from a location at or adjacent an end of the cradle portion,
   the flexible member having a free end and formations at or near the free end to engage with other formations fixed in relation to the cradle portion such that the cradle portion and the flexible member define an enclosing loop, such that the flexible member may hold the item against the cradle portion,
   wherein the cradle portion is formed as surfaces of an inwardly facing aspect of a cradle member, and the other formations are on an outwardly facing aspect of the cradle member, and a retaining member is spaced apart from the outwardly facing side of the cradle member sufficient that the free end of the flexible member may pass between the retaining member and the cradle member, wherein the cradle member supported from one or more of the retaining member and the fixing portion by walls at both sides adjacent an end of the cradle member, to leave a socket into which the free end of the flexible member may be inserted, the socket defined by the retaining member, the cradle member and the walls, and wherein at least one of said walls at a side adjacent said end of said cradle member is frangible.

2. A clip as claimed in claim 1, wherein the formations progressively engage with tightening of the loop and prevent loosening of the loop through direct tension on the flexible member.

3. A clip as claimed in claim 1, wherein a form and arrangement of the flexible member, the cradle member and the retaining member are such that the engagement between formations is enhanced by tension applied to the flexible member.

4. A clip as claimed in claim 1, wherein the free end of the flexible member has a stiffness sufficient that the outwardly facing surface or edge of the free end bears against the retaining member by pivoting of the free end around an end of the cradle member when tension is applied to the flexible member, with engagement between formations of the flexible member and the cradle member at or adjacent a fulcrum of this pivot.

5. A clip as claimed in claim 1, wherein the cradle member, the flexible member and the formations are formed from a plastic material as a single body.

6. A clip as claimed in claim 1, wherein the fixing portion includes at least one tab portion extending away from the cradle member, the tab portion including a fixing formation.

7. A clip as claimed in claim 1, wherein the flexible member is sufficiently stiff to be self-supporting, and extending in an arc generally away from the cradle member and fixing portion, across above the cradle member and back toward the cradle member and fixing portion, such that the flexible member defines more than half of the perimeter of the loop.

8. A clip as claimed in claim 7, wherein the flexible member defines more than two thirds of the perimeter of the loop.

9. A clip as claimed in claim 1, wherein the flexible member includes formations distributed along the inner surface for a length greater than the length of the cradle member.

10. A clip as claimed in claim 1, wherein the flexible member includes ribs on an outward surface of the flexible member.

11. A clip as claimed in claim 10, wherein one or more of the ribs, when in association with said cradle member, urges the flexible member into greater engagement in a socket of the cradle member.

12. A clip as claimed in claim 11, wherein one or more of the ribs that enter a socket of the cradle member, runs on the surface of the retaining member, to pivot an inserted portion of the flexible member toward the cradle member, and in-use, encourage or bring formations of the socket and the flexible member into an engaged condition.

13. A clip as claimed in claim 1, wherein the flexible member includes a zone intended for cutting such that the member may be shortened to the zone.

14. A clip as claimed in claim 13, wherein the zone for cutting is adjacent a rib on the outer surface, being located along the flexible member between the rib and the free end.

15. A clip as claimed in claim 1, wherein the loop can be at least 50 mm diameter.

16. A clip as claimed in claim 1, wherein the formations on the flexible member extend at least 60 mm along the flexible member.

17. A clip as claimed in claim 1, wherein said at least one wall at one side of said end of said cradle being frangible, is formed so as to be readily removed or rendered passable.

18. A clip as claimed in claim 1, wherein the socket includes an opening on the opposite side from the frangible wall, the opening being spaced from the entrance to the socket, in use a tool may be inserted into the opening to act against a portion of the flexible member which is engaged within the socket.

19. A clip as claimed in claim 1, wherein the formations are such that they engage against tension of the flexible member, but allow lateral displacement of the flexible member relative to the cradle member, in the absence of other constraints.

20. A clip as claimed in claim 1, wherein the fixing portion comprises a pair of tabs having support surfaces for pressing on a mounting surface in use, the support surfaces being substantially on a plane, with the cradle member and flexible member being wholly located to one side of the plane.

21. A clip as claimed in claim 20, wherein the retaining member extends between the tabs of the fixing portion.

22. A clip as claimed in claim 21, wherein the cradle member is supported in a condition spaced above the retaining member.

23. A clip as claimed in claim 21, wherein the retaining member is spaced from the plane.

24. A clip as claimed in claim 1, wherein the flexible member extends from a location adjacent one end of the cradle member, but spaced below the surface of the cradle portion.

25. A clip as claimed in claim 1, wherein the cradle portion is defined by a concave wall member.

26. A clip as claimed in claim 1, wherein said at least one of said walls being frangible is a side wall located at or towards or an entrance of said socket of said cradle member.

27. A clip as claimed in claim 1, wherein the clip is slidably adjusted relative to said support.

28. A clip as claimed in claim 1, wherein the fixing portion or said support, or both, comprise indexed formations for indexed positioning of said clip and said support.

29. A clip as claimed in claim 28, wherein the fixing portion comprises of an indexed formation or set of indexed formations having support surfaces for reciprocal engagement or receipt, in use, with a mounting surface comprising a reciprocally indexed formation or set of indexed formations.

30. A clip as claimed in claim 29, wherein the fixing portion further comprises of at least one additional support surface disposed toward or at one or each end of the indexed formations, the additional support surface for location upon or engagement with one or more surfaces of the mounting surface in use.

31. A clip as claimed in claim 30, wherein the fixing portion comprises a pair of additional support surfaces, a first of the pair of additional support surfaces comprises a pair of lugs disposed toward or at a first end of the fixing portion.

32. A clip as claimed in claim 31, wherein the lugs are configured to be, in use, located adjacent to or inserted into, a respective pair of lug recesses of the mounting surface.

33. A clip as claimed in claim 32, wherein the lugs or the lug recesses, or both the lugs and the lug recesses, are shaped or configured so as to locate and/or retain the lugs, and optionally allow for a relative rotation of said respective lug and lug recess.

34. A clip as claimed in claim 32, wherein at least one of said lugs is swivelling or rotatable relative to the mounting surface or a said lug recess, optionally at least one of said lugs comprises a rotatable or swivelling element(s) or a pivoting element or point with respect to the clip, or the lug recesses comprises a rotatable or swivelling or a pivoting element(s) or point, or each of said lugs and said lug recesses comprises a said rotatable or swivelling or pivoting element(s) or point.

35. A clip as claimed in claim 31, wherein each lug of a pair of lugs project toward each other, with a gap between their opposing surfaces so as to provide for a clamping region, the mounting surface with the lug recesses to be received within the clamping region.

36. A clip as claimed in claim 31, wherein engagement of the lugs with the lug recesses facilitates a retention or connection of the first end of the fixing portion to a mounting surface.

37. A clip as claimed in claim 31, wherein the clip is swivelling or rotatable or pivoting with respect to a connection point of the lugs with said lug recesses yet maintains a connection with said mounting surface.

38. A clip as claimed in claim 31, wherein a second of the pair of additional support surfaces comprises a pair of tabs disposed at or toward a second end of said fixing portion.

39. A clip as claimed in claim 38, wherein one or each of said tabs is shaped or includes a surface formation to locate with or engage with a said mounting surface.

40. A clip as claimed in claim 39, wherein the shaping or surface formation of the or each said tab is configured to engage with the mounting surface, in use, allowing for a connection and disconnection, in use, by a user, yet which is restrained sufficiently so as to avoid an unintended disconnection.

41. A clip as claimed in claim 31, wherein haptic feedback is generated from one or more of: engagement or location or connection of one or each of said additional support surfaces with a said mounting surface, including one or more lugs with one or more lug recesses, engagement or location or connection of one or each a shaped or surface formation of a tab with a said mounting surface.

42. A clip as claimed in claim 31, wherein the additional support surfaces extend from the fixing portion in a direction that is away from the retaining member and the fixing portion.

43. A clip as claimed in claim 31, wherein the additional support surfaces extend a distance such that their respective location or engagement with the mounting surface is made in conjunction with the simultaneous engagement or mating of the indexed formations of the fixing portion with the reciprocally indexed formations.

44. A clip as claimed in claim 31, wherein the mounting surface is a rail.

45. A clip as claimed in claim 44, wherein the rail is mountable to another surface or mounting surface.

46. A clip as claimed in claim 45, wherein the mounting surface, when in the form of a rail, can be provided as a part of an adjustable clip and mounting assembly, said assembly providing for a combination of the indexed formations and the reciprocal indexed formations and for the relative positioning of the fixing portion (and therefore the clip) to the mounting surface.

47. A clip as claimed in claim 45, wherein the rail comprises of a surface as a slide for receiving the indexed formations of the clip, or the comprises of reciprocally indexed formations for reciprocal engagement with the indexed formations projecting from the fixing portion of said clip.

48. A clip as claimed in claim 45, wherein engagement of respective indexed formations of said clip and said rail allow for an indexed positioning or adjustment of the clip and the rail to each other and/or to provide a support of each part to the other.

49. A clip as claimed in claim 45, wherein the rail comprises of one or a series of apertures for receiving of a fastener, the fastener for attaching or connecting the rail to a surface or another mounting surface.

50. A clip as claimed in claim 49, wherein said apertures are located along a length of the rail, and may be centrally located along a length of said rail.

51. A clip as claimed in claim 49, wherein the fixing portion comprises one or more fixing formations for receiving therethrough a fastener for connection to the rail and through the apertures into a further mounting surface or a structure.

52. A clip as claimed in claim 49, wherein the rail comprises one or a series of said lug recesses, each of said lug recesses located along a length of the rail, and optionally may be located along one or multiple edge regions of the rail for receipt of said lugs.

53. A clip as claimed in claim 49, wherein the rail comprises a stepped region along one or multiple edge regions substantially adjacent to the reciprocally indexed formations, said stepped region being a structure for retaining or locating of the shaped or surface formation of one or both of said tabs extending from the fixing portion.

54. A clip as claimed in claim 49, wherein the clip is rotatable, swivellable, or pivotable away from said mounting surface in a manner so as to disengage indexed formations of said clip from indexed formations of said mounting surface.

55. A clip as claimed in claim 1, wherein said at least one of said walls being frangible is a side wall located at or towards or an entrance of said socket of said cradle member.

* * * * *